US005729250A

United States Patent [19]

Bishop et al.

[11] Patent Number: 5,729,250

[45] Date of Patent: Mar. 17, 1998

[54] FRONT COVER ASSEMBLY FOR A TOUCH SENSITIVE DEVICE

[75] Inventors: Edward H. Bishop, Durham; Alfred William Connor; Aaron Roger Cox, both of Raleigh; Dennis Crompton, Apex; Mark Gehres McDonald, Clayton, all of N.C.

[73] Assignee: International Business Machines Corporation, Armonk, N.Y.

[21] Appl. No.: 437,008

[22] Filed: May 8, 1995

[51] Int. Cl.⁶ .................................................. G09G 5/00
[52] U.S. Cl. ........................................ 345/175; 345/173
[58] Field of Search ............................. 345/175, 173, 345/176, 177; 348/825, 826, 832, 818; 178/18; 200/514; 463/37; D14/113, 100

[56] References Cited

U.S. PATENT DOCUMENTS

| 4,387,367 | 6/1983 | Fisher | 340/365 |
|---|---|---|---|
| 4,771,277 | 9/1988 | Barbee et al. | 340/712 |
| 4,775,765 | 10/1988 | Kimura et al. | 178/18 |
| 4,812,830 | 3/1989 | Doering | 345/175 |
| 4,847,606 | 7/1989 | Beiswenger | 345/175 |
| 4,898,555 | 2/1990 | Sampson | 345/175 |
| 4,977,486 | 12/1990 | Gotoh | 345/175 |
| 5,049,613 | 9/1991 | Shimizu et al. | 525/66 |
| 5,565,934 | 10/1996 | Boudreau et al. | 348/818 |

*Primary Examiner*—Michael H. Lee
*Attorney, Agent, or Firm*—John D. Flynn; Joseph C. Redmond, Jr.

[57] ABSTRACT

A front cover assembly is provided for use with a touch sensitive display device. The touch sensitive display device includes a display such as a Cathode Ray Tube (CRT) or Liquid Crystal Display (LCD). The front cover assembly has a top cover, an infrared bezel and a piece of glass. The top cover is inserted into a mold along with the piece of glass. The top cover and glass are then held in place by a vacuum while polyurethane is injected to fill the void between the glass and the top cover and the mold. The polyurethane is injected using injection molding techniques. The polyurethane used must have the properties of flexibility, durability and must also be transparent to infrared light. The polyurethane provides a mechanical lock around the glass and top cover and thus the polyurethane compensates for the different rates of expansion and contraction of the glass and the top cover due to temperature variations in the ambient environment. The polyurethane provides a mechanical lock that prevents liquids from seeping or entering from the top portion of the front cover assembly protecting the touch sensitive display device.

23 Claims, 7 Drawing Sheets

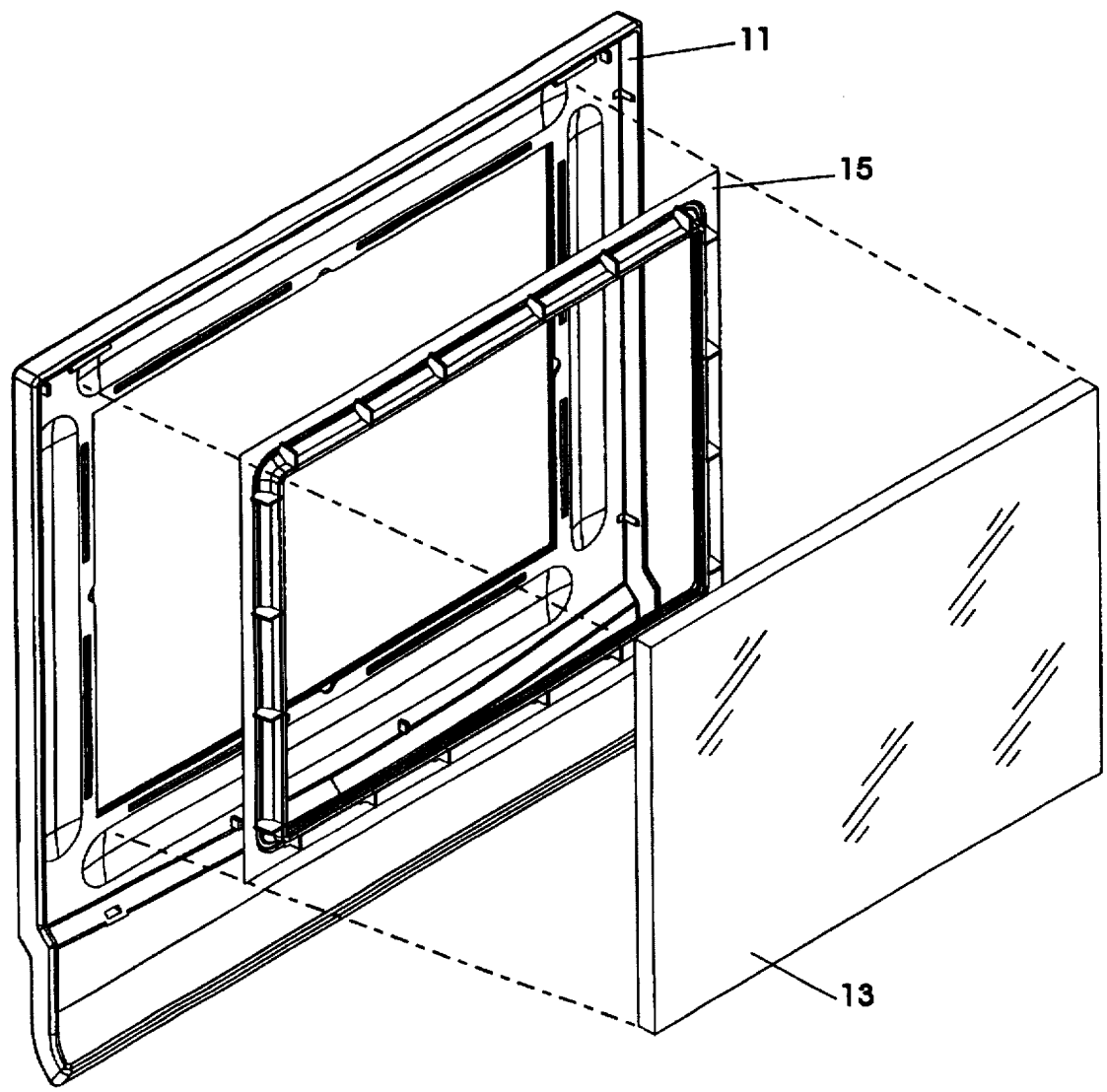

FRONT COVER ASSEMBLY FOR A TOUCH SENSITIVE DEVICE

BACKGROUND OF THE INVENTION

1. Field of the Invention

The present invention relates to a from cover assembly and a method of making the same and in particular, to a front cover assembly for a touch sensitive device that provides a watertight seal, infrared filtering and that is insensitive to ambient temperature variations.

2. Description of the Prior Art

One type of interactive computer system permits an operator to enter information into the computer by selectively touching points on the screen of a computer monitor or display device, such as a Cathode Ray Tube (CRT) or Liquid Crystal Display (LCD), upon which is displayed relevant information. One such touch input system provides an arrangement of radiation emitter and detector pairs, for example a plurality of light emitters (typically in the infrared range) arranged along one vertical side and one horizontal side of the display screen, and a plurality of detectors arranged along the other horizontal and vertical sides. The resulting rectangular arrangement of emitter and detector pairs produces a corresponding light beam grid over the display screen that when interrupted by the operator's finger or a pointer or other object, permits the touched screen location to be determined by the computer or display electronics. The computer can then relate the location to information being displayed at the touch screen location. The advantage of a touch screen is that the operator may simply touch the display object or portion of the display screen to select, highlight or otherwise input information.

In most environments, and in food service environments in particular, computers are subject to liquids, foods, grease, moisture, and other contaminants. This is particularly a problem in food services where cashiers are often required to consummate transactions as well as provide the customer with the purchased food and drink. The point of sale devices that the cashier uses to input transaction information are often subject to liquids, foods, grease, moisture from handling of the food and drink by the cashier and other contaminants incident to food service. These contaminants can be transferred to the point of sale device when the cashier inputs transaction related information (e.g., customer's order, amount tendered, etc...). Furthermore, food and drink are often spilled or drip on to the device itself. Contamination of the display and/or display cover is particularly a problem in computer systems that use touch input. This is because the cashier is constantly touching the device, handling the food and drink and because the cashier's skin generates or secretes oil naturally. Thus, these touch devices need be cleaned frequently. Cleaning the front cover compounds the situation by subjecting the device to cleaning fluids, liquids and/or solutions. The cleaning fluids can cause additional reactions with the display elements. Thus, in order to operate properly in a harsh food service environment a permanent liquid tight seal is needed to protect sensitive electronic display elements.

Prior art techniques have attempted to solve this problem in several ways. Typically, a front cover for a touch screen would contain one or more gaskets. Not only do gaskets leak after exposure to harsh cleaning fluids but, they also require the use of additional assembly steps and the addition of the gasket(s) itself. The gasket must be attached and seated properly in order to function effectively. The use of gaskets requires multiple operations and parts which make front covers using gaskets expensive to manufacture. Gaskets also tend to leak after a relatively short period of time due to the expansion and contraction of the gasket itself due to temperature changes in the environment and exposure of the gasket material to the harsh cleaning chemicals used in many food service establishments.

Another prior art technique involves using a transparent polycarbonate material that is fused to the plastic cover by injection molding and mechanically mated with a glass or other transparent material. Due to the different amounts of thermal expansion and contraction experienced by its coacting elements (cover material, transparent material, glass) due to ambient temperature changes the elements deform. This results in warping, transforming, distorting, breaking, cracking, wrinkling, or otherwise transforming the elements. Additionally, no effective sealing-out of contaminants is provided. Unfortunately, due to the different rates of expansion and contraction of the different materials (cover material, transparent material, glass) a watertight seal can not be maintained and other techniques such as providing for the dissemination of spilled materials (i.e., drainage areas) are necessary in order to provide some form of spill resistance. Fluid dissemination beneath the cover entails use of additional materials and parts which can increase the cost of manufacture. Also such covers become more difficult to clean in that the cover must be removed to thoroughly clean the cover and underlying electronics. This further subjects the electronic components to remnants of the spills and harsh cleaning fluids.

Accordingly a need exists for a front cover assembly for a touch sensitive device that accommodates differential thermal expansion between elements and provides an effective liquid tight seal to protect against pollutants and spillage and that is readily attached to the touch sensitive device with which it is used.

SUMMARY OF THE INVENTION

It is an object of the present invention to provide a front cover assembly that protects a display device from spills and moisture.

It is an objective of this invention to provide a front cover assembly which accommodates for different amounts of thermal expansion and contraction experienced by its coacting elements due to ambient temperature changes, without deleterious deformations thereof.

It is another objective of this invention to provide a front cover assembly which accommodates the different amounts of thermal expansion and contraction experienced by its coacting elements due to ambient temperature changes, without deleterious deformations, while also maintaining effective sealing-out of contaminants.

It is yet another objective of this invention to provide a front cover assembly that is easily attachable to a touch sensitive display device for use therewith.

It is a further object of the present invention to provide a front cover assembly that is easier to manufacture.

It is still a further object of the present invention to provide a front cover assembly that provides a liquid tight seal.

It is still a further object of the present invention to provide a front cover assembly that is easily cleaned.

It is still a further object of the present invention to provide a front cover assembly that is easier to manufacture than gaskets or vacuum formed parts that may require secondary operations like trimming and finishing.

It is still a further object of the present invention to provide a front cover assembly that does not have be cleaned frequently.

It is still a further object of the present invention to provide a front cover assembly that does not scratch easily.

It is still a further object of the present invention to provide a front cover assembly that accommodates differential thermal expansion between elements and still provides a liquid tight seal.

It is still a further object of the present invention to provide aから cover assembly that accommodates differential thermal expansion between elements without warping, transforming, distorting, breaking, cracking, wrinkling, or otherwise transforming the elements.

In accordance with a preferred embodiment of the present invention, a front cover assembly is provided for use with a touch sensitive display device. The touch sensitive display device includes a display such as a Cathode Ray Tube (CRT) or Liquid Crystal Display (LCD). The front cover assembly has a top cover, an infrared bezel and a piece of glass. The top cover is inserted into a mold along with the piece of glass. The top cover and glass are then held in place by a vacuum while polyurethane is injected to fill the void between the glass and the top cover and the mold. The polyurethane is injected using injection molding techniques. The polyurethane used must have the properties of flexibility, durability and must also be transparent to infrared light. The polyurethane provides a mechanical lock around the glass and top cover and thus the polyurethane compensates for the different rates of expansion and contraction of the glass and the top cover due to temperature variations in the ambient environment. The polyurethane provides a mechanical lock that prevents liquids from seeping or entering from the top portion of the front cover assembly protecting the touch sensitive display device.

BRIEF DESCRIPTION OF THE DRAWINGS

The foregoing and other objects, aspects and advantages of the invention will be better understood from the following detailed description with reference to the drawings, in which:

FIG. 4 is a rear view of a front cover assembly.

DETAILED DESCRIPTION OF THE INVENTION

Figure 1:
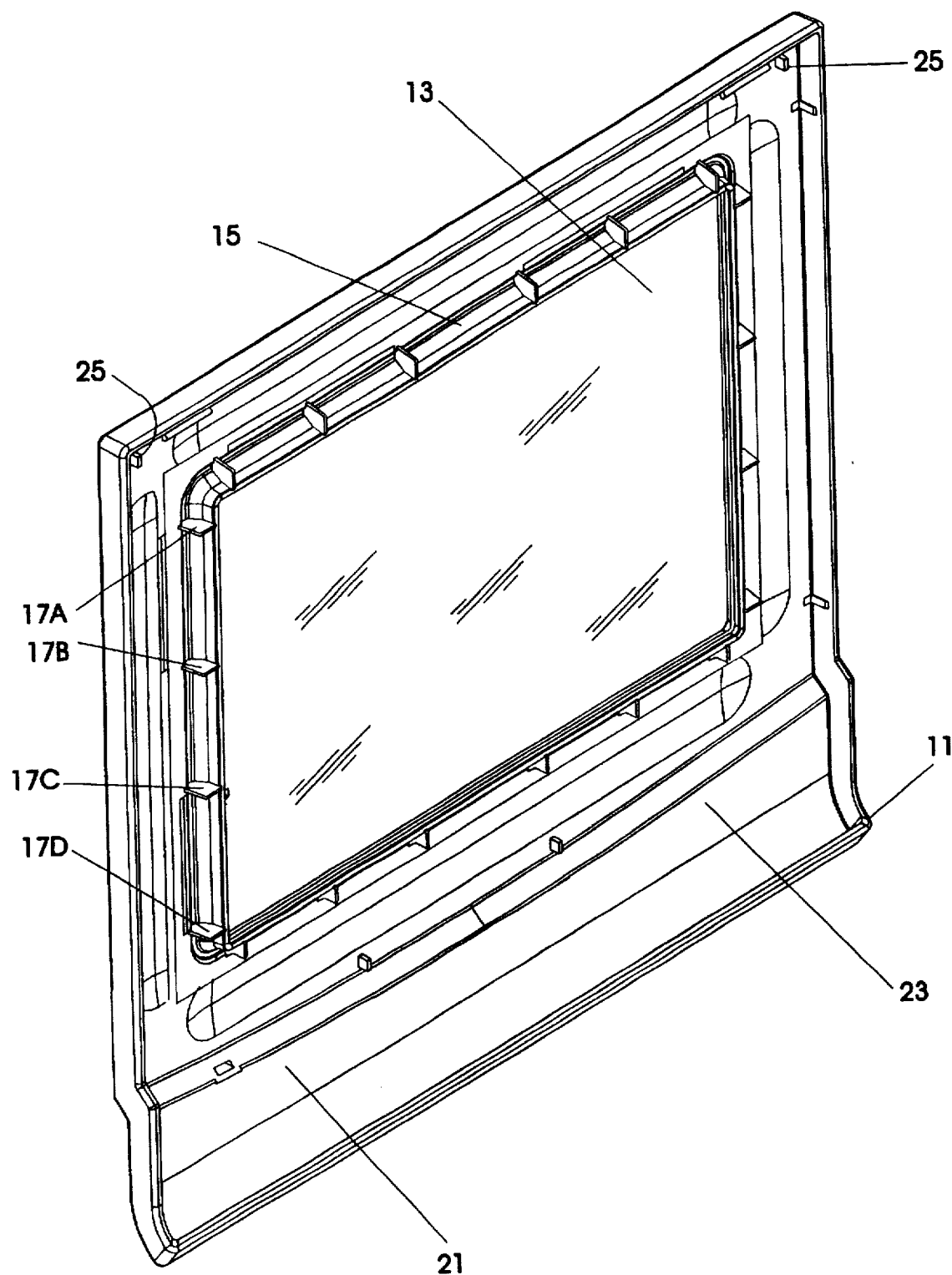
FIG. 1 is a rear isometric view of a front cover assembly.
Figure 2:
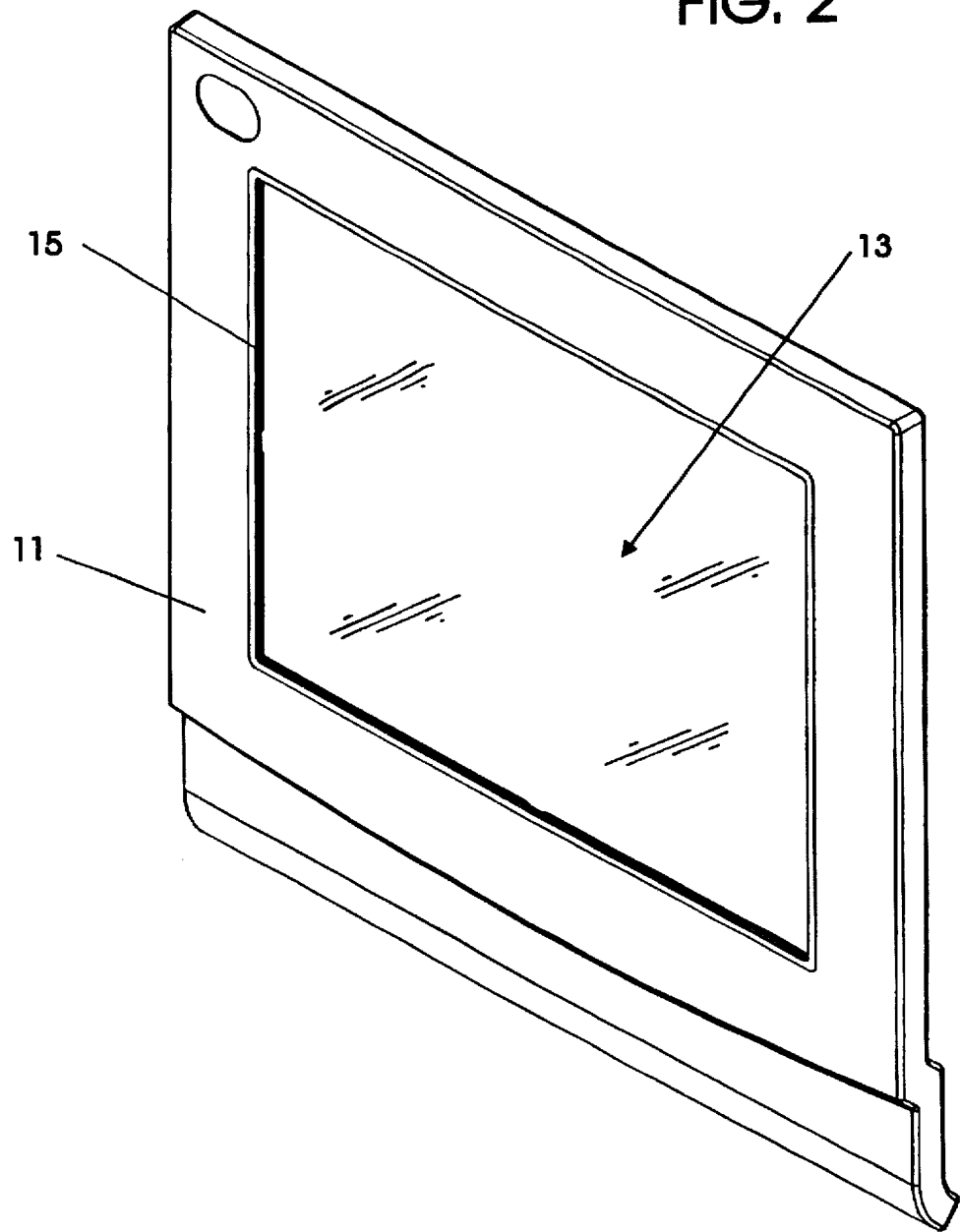
FIG. 2 is a front isometric view of a front cover assembly.

The present invention is a front cover assembly. The front cover assembly may be utilized with a touch sensitive device to prevent liquids from damaging the display and associated electronics of the touch sensitive device. The front cover assembly, as shown in FIG. 1, comprises a top cover 11, an IR bezel 15 and a piece of glass 13. The top cover is typically made of a polycarbonate material using injection molding techniques. The glass 13 may be of any type but, laminated or tempered glass provides better scratch resistance. The IR bezel 15 is made of polyurethane using injection molding techniques as described below.

According to a preferred embodiment, the present invention comprises a top cover 11 made by injection molding of polycarbonate to form the top cover outer construction. In the preferred embodiment the top cover material is made from polycarbonate material designated as M-H 5-2393-110,9206 Polycarbonate/ABS Blend Flame Retarded (Bromide & Chloride Free) Vicat 110 degrees Celsius, UV Stable; Bayblend tiame retardant. This material is available from Bayer incorporated. Note that in the preferred embodiment the top cover 11 has an opening that is rectangular in shape.

Figure 6:
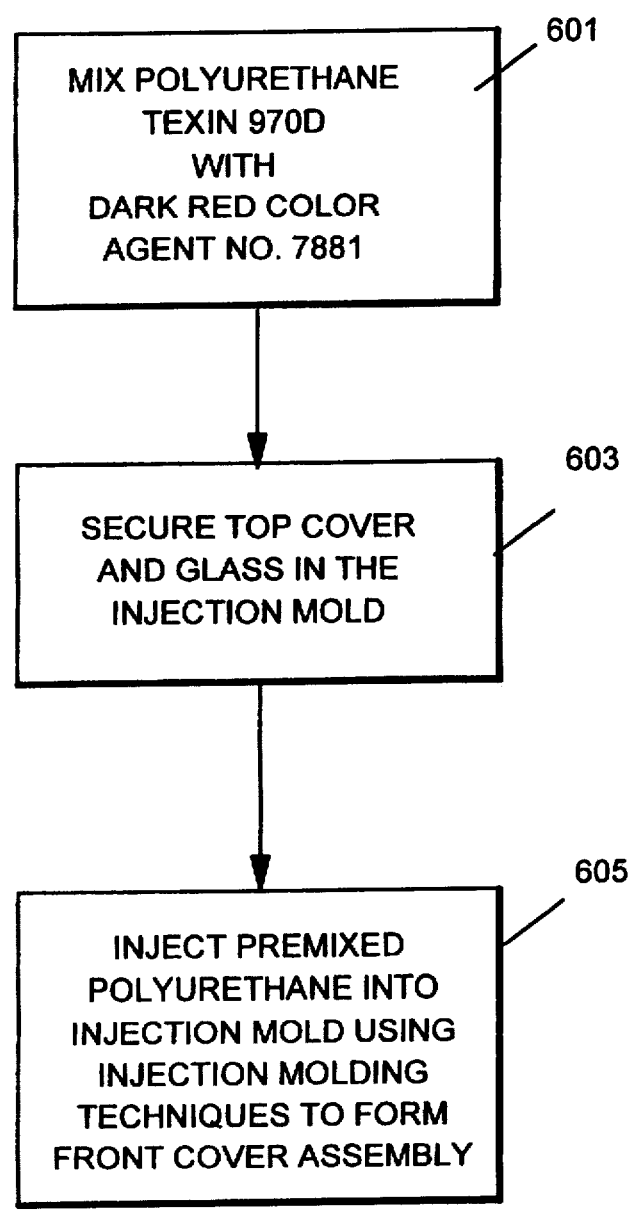
FIG. 6 show the steps involved in carrying the process of making a front cover assembly in accordance with the present invention.

The top cover 11 becomes an insert into a second mold (a mold other then the mold used to create the top cover). A piece of glass 13, which provides the protection for the display underneath, is also inserted into the mold. Tempered glass is the preferred material because it is strong, scratch resistant and optically clear. The top cover 11 and tempered glass 13 are then held in place while polyurethane is injected to fill the void between the glass and the top cover and the mold. In the preferred embodiment a vacuum is used to hold the glass and top cover in place. However, other means of holding the top cover and glass in place may be used as well. The mold is designed to form the IR bezel in accordance with the present invention. The polyurethane used must have the properties of flexibility, durability and must also be transparent to infrared light. In the preferred embodiment polyurethane, designated as Texin 970D and available from Bayer Incorporated, is the preferred type of polyurethane for the bezel material. The process steps are depicted in FIG. 6.

In order to utilize the front cover assembly with an infrared touch sensitive display device, infrared light must be transmitted through the bezel across the touch surface and back through the bezel to an IR detector. An IR grid or pattern is thus formed over the glass surface of the from cover assembly. Touches are detected when one or more of the IR beams transmitted across the surface is broken. In order to operate properly the IR bezel must also be able to transmit a significant portion of infrared light that shines through it and block or filter out other wavelengths of light. Also, the front cover assembly has a better aesthetic appeal if the IR elements and/or display elements are not visible when looking through the bezel. This is achieved by mixing a coloring agent with the raw polyurethane material before injection molding the polyurethane. In the preferred embodiment the color agent is designated as Color #7881 Dark Red commercially available from Bayer Inc. The premixed polyurethane with color agent may also be obtained from Bayer Inc. The premixed polyurethane with color agent is then injected into the mold as described above.

The polyurethane IR bezel provides a mechanical lock around the glass and top cover rather than a fusing of plastic to plastic. The polyurethane compensates for the different rates of expansion and contraction of the glass and the polycarbonate top cover during the molding process and in use due to temperature variations in the ambient environment (this includes heat generated from the display device and associated electronics). The IR bezel thus provides for the ability to expand and contract without the side effects that occur if another type of plastic bezel were utilized. Without this ability to compensate for temperature variations, the bezel would crack, break the glass or damage the top cover or lose its liquid tight seal. It is important to note that the injection molding technique using polyurethane does not result in fusion of the IR bezel to the top cover or glass. It provides a mechanical lock that prevents liquids from seeping or entering from the top portion of the from cover assembly. The mechanical locking allows the materials to expand and contract independent of one another. The independent expansion and contraction of the glass, bezel and top cover prevent damage that might result if the any of materials were fused together. The result of this processes is a front cover assembly that has a strong, liquid tight seal, a clear scratch resistant viewing area and an infrared bezel filter suitable for use with an infrared touch screen.

Figure 3A:
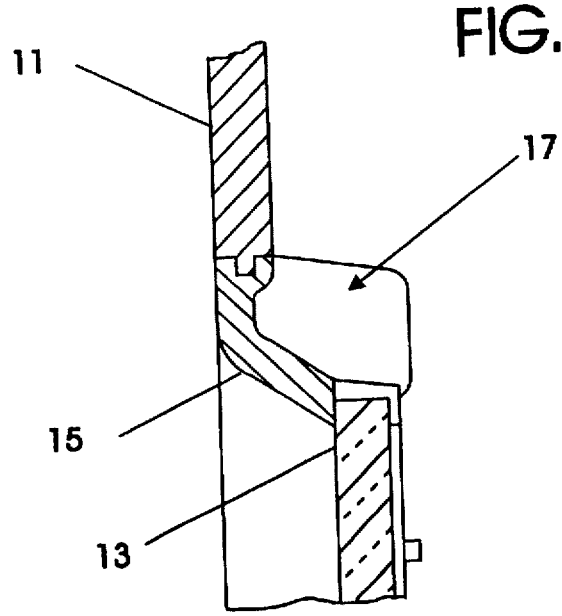
FIG. 3(a) is an a cut-a-way view of a portion of a front cover assembly.

One embodiment of the mechanical lock provided by the present invention is shown in FIG. 3(a) which depicts a cross section of a portion of the front cover assembly. The IR bezel 15 mechanical locks the glass 13 and the top cover 11 in place as shown. The IR bezel 15 surrounds the edge of the glass such that outer edge of the glass is mated to the IR bezel providing for a liquid tight seal. A u-shaped receptacle is formed by the IR bezel for receiving the glass edge. The IR bezel also receives the inner edge of the top cover 11, or a portion of the edge, as shown in FIG. 3(a). The opening of the top cover has an inner edge that has a finger like protrusion to which the IR bezel is molded around. A receptacle is formed by the IR bezel for receiving the top cover's inner edge. Thus, the IR bezel formed using injecting molding techniques provides a liquid tight seal between the glass and top cover. Note the cross section features a tab 17A. The tabs provide a spacing between the display surface and the touch surface (i.e., glass 13). The tabs are formed as an integral part of the IR bezel and provide the advantages discussed below.

Figure 3B:
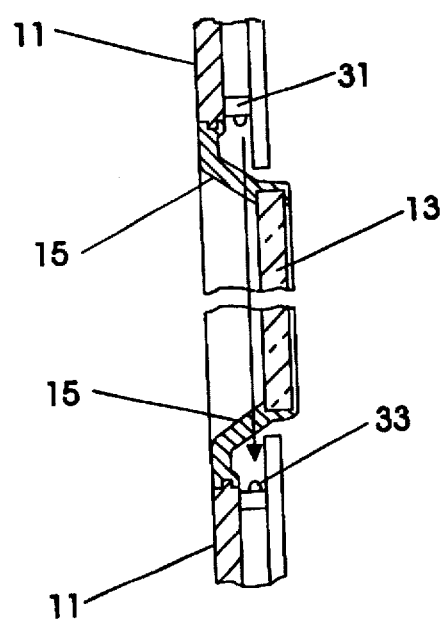
FIG. 3(b) is a cut-a-way view of a front cover assembly showing the placement of infrared transmitter receivers and display surface.

FIG. 3(b) depicts a cross section of the front cover assembly. The IR bezel 15 mechanically locks the glass 13 and the top cover 11 in place as shown. Also shown is a IR transmitter 31 and IR receiver 33. A plurality of these elements are used to form a grid over the glass 13. Note that the operator's finger, or other object, can only touch the glass 13 of the front cover assembly and not the underlying display surface. The IR grid formed above the glass is used to determine the touch position on the front cover. IR transmitter 31 transmits an IR beam through the IR bezel, across the glass surface, through the IR bezel on the opposite side to the IR receiver. An LED may be used to generate the requisite IR beam. Note that the IR devices and display device are protected from spills, only the IR beams are exposed above the from cover assembly.

The IR bezel may also contain a plurality of tabs, shown as 17 on FIG. 1. When assembled with a touch sensitive device these tabs rest on the outer structure or frame of the touch display. In a preferred embodiment the touch display is a Liquid Crystal Display (LCD) that uses IR transmitters/ receivers for sensing touch. LCDs suffer from an effect known as bleeding when the display itself is touched. Bleeding occurs in the vicinity of a touch or when a force causes a deformation in the thickness of the LCD material. Bleeding is the puddling that results in the vicinity of the touch. This bleeding or puddling is a temporary distortion that makes it difficult for the operator to determine what is displayed on the LCD in the vicinity of the touch. The tabs 17 on the bezel 15 help to diffuse the touch force by transferring the touch force to the frame containing the LCD. Thus, any force is distributed about the LCD frame and not concentrated in one LCD area. The tabs 17, by transferring the touch force to the frame of the LCD and also by providing a small gap between the LCD surface and the touch surface (i.e., the glass of the front cover assembly), reduce the bleeding or puddling effect. In the preferred embodiment the tabs are 0.015 inch above the glass.

Figure 5A:
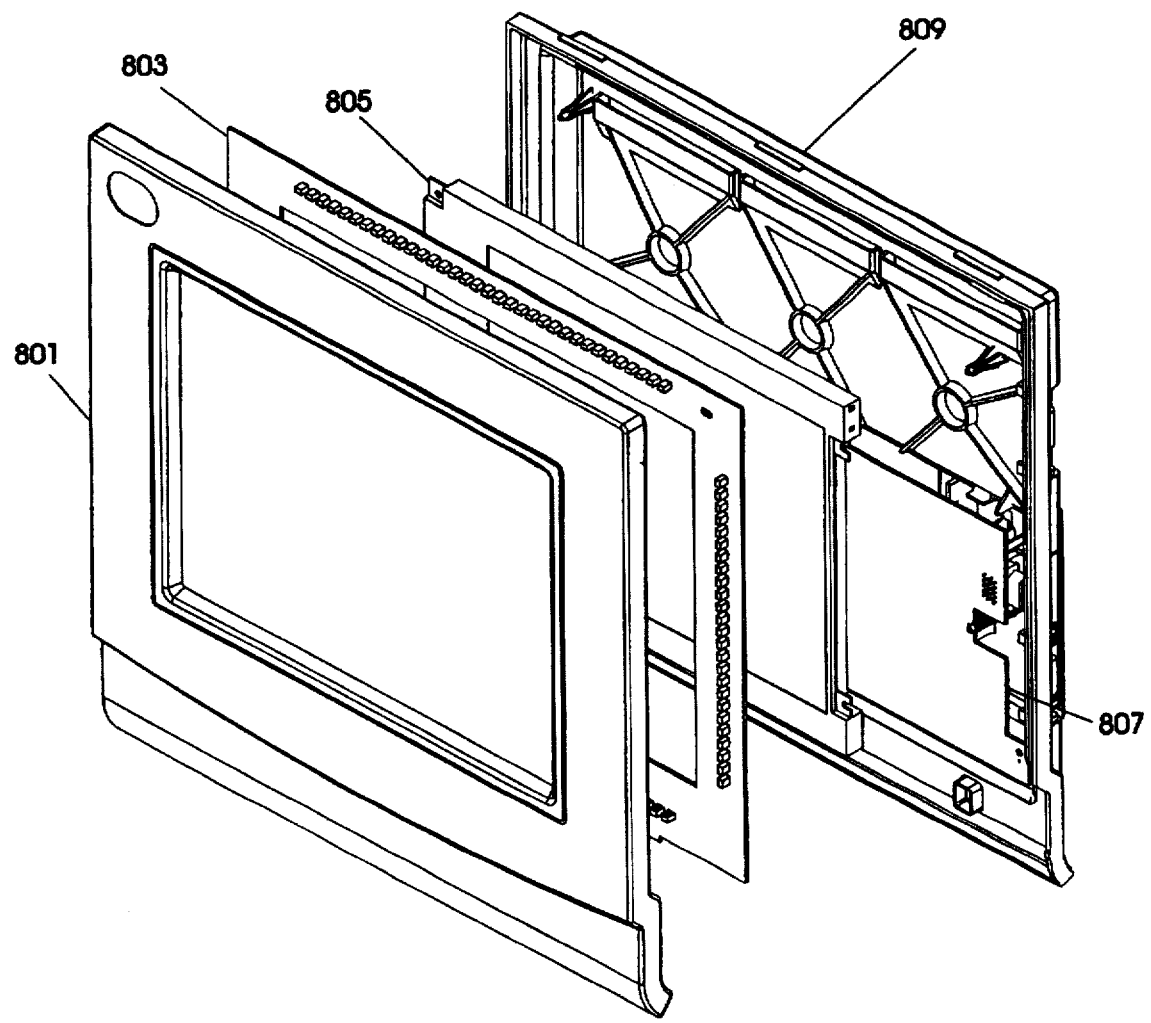
FIG. 5(a) is an exploded front view of a display tablet.
Figure 5B:
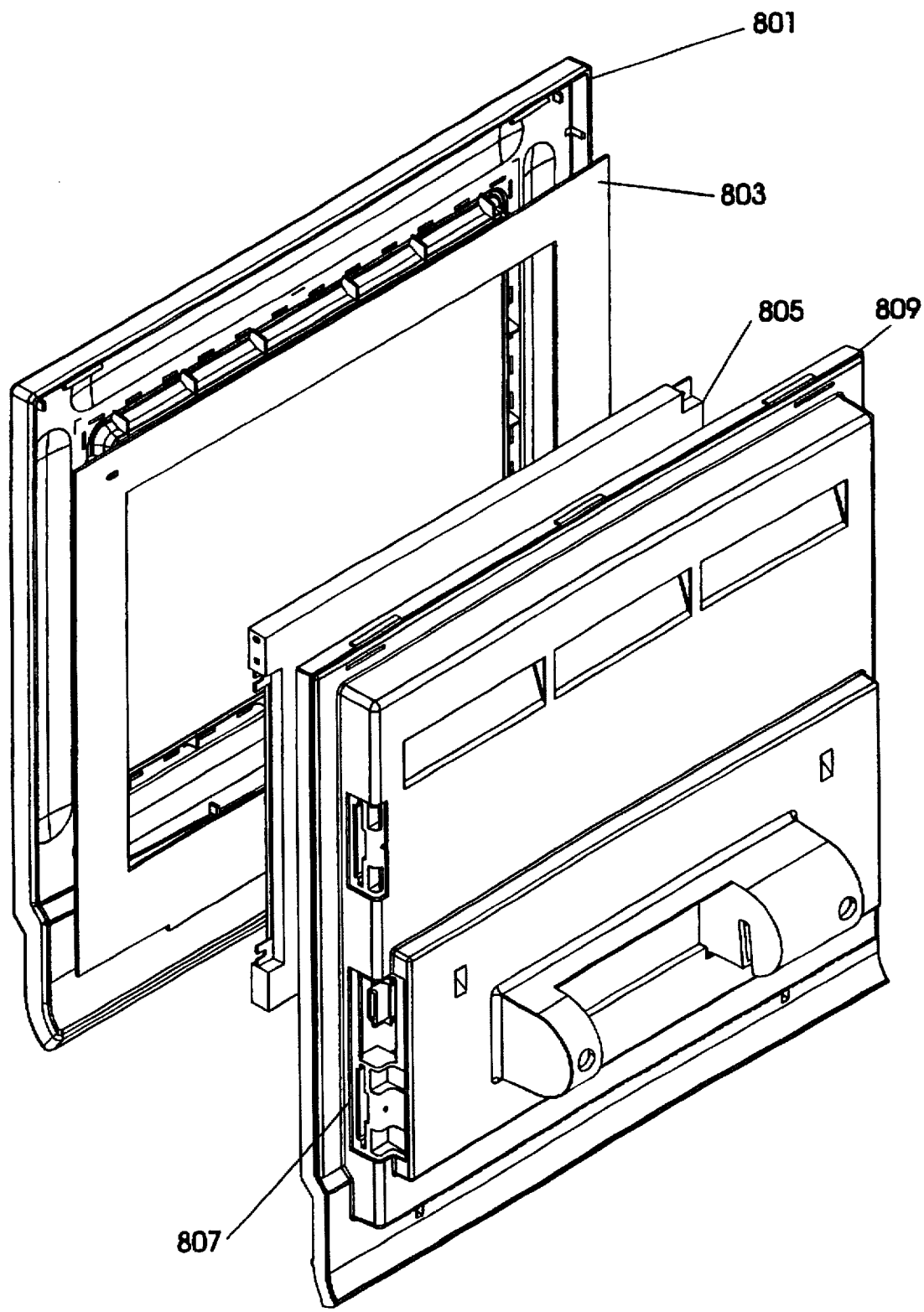
FIG. 5(b) is an exploded rear view of a display tablet.

The front cover assembly also contains elements that are used in mating the front cover assembly to the display device. These display mating elements (21, 23, 25, 27) are shown in FIG. 1 as part of the top cover 11. Other means of attaching the front cover assembly may also be utilized such as screws, nuts and bolts. Exploded views of a display tablet containing the front cover assembly are shown in FIG. 5(a) and FIG. 5(b). The mating elements and the IR bezel aid in securing the front cover assembly 801, touch ring 803, display assembly 805, touch controller 807 and rear cover 809. These elements form the display tablet. The touch ring 803 contains the infrared transmitters and receivers that form the IR beam grid over the glass in the front cover assembly 801. The touch ring 803 is electrically coupled to the touch controller 807 which determines the location of touches and controls the touch ring 805. The display assembly is an LCD which presents information to an operator. The rear cover 809 is made of polycarbonate material using injection molding techniques. The front cover assembly and rear cover both contain mating elements for snapping the front cover assembly to the rear cover with the touch ring, display assembly and touch controller held securely in between to form a display tablet. The display tablet can then be attached to tilt adjustment mechanism or a system unit and used by an operator as a point-of-sale system.

The touch ring 803 has one side and the top with photo receivers which are sensitive to infrared light. The other side and the bottom have the photo transmitters. It is not important which side has the transmitters or receivers but it is better for the top to have the receivers so ambient light will have greater difficulty getting to the receivers. The LCD Assembly 805 can be any flat panel display. This includes active or passive LCDs, electro-luminescent or plasma, or any other flat display. Any of the following LCDs available from Sharp: LM64P89 (10.4" STN monochrome), LM64C15P (9.5" STN color) and LM64C35P (10.4" STN color) are suitable for use. The touch controller 807 contains one or more mircocontrollers that provide multiple functions. The touch controller 807 provides an interface between the touch ring and a mircrocontroller. In the preferred embodiment this is accomplished using ASIC and a masked 80C52 chips available from Carroll Touch, INC. The touch controller 807 may also provide a magnetic stripe reader interface connecting the MSR (housed in plastic) directly to the main microcontroller (80C452). The touch controller 807 may also provide cash drawer control and sensing the state of the cash drawer (open, closed or not present). The touch controller also generates the voltages required by the LCD Assembly 805 such as software controlled contrast voltage, power sequencing signals and LCD supply voltage and also provides the interfaces signals (clocks & data), which while not generated by the touch controller 807 are filtered by the touch controller 807 for EMC purposes.

Note also that the rear cover 809 contains elements for mounting the display tablet on a tilt adjustment mechanism. A suitable tilt adjustment mechanism is shown in co-pending application Ser. No. 08/597,654 entitled "A Tilt Adjustment Mechanism" IBM Docket number RA9-95-026 hereby incorporated by reference.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A front cover assembly for an infrared touch sensitive device comprising:

a top cover;

a piece of glass;

an integral bezel for securing said glass to said top cover wherein said bezel is formed by injection molding polyurethane between said glass and said top cover while said glass and said top cover are held in a fixed relationship to each other, wherein said bezel forms a mechanical lock between the top cover and the glass that provides a liquid tight seal, said bezel compensating for the different rates of expansion and contraction of the top cover and glass in maintaining the mechanical lock and liquid seal;

tab members formed in the bezel providing a small gap between the touch sensitive device and the glass to reduce bleeding or puddling of the touch sensitive device when a touch force is applied to the glass; and a frame surrounding the touch sensitive device and receiving touch forces transferred thereto by the tab members.

2. The front cover assembly of claim 1 wherein said glass is tempered glass.

3. The front cover assembly of claim 1 wherein said glass is laminated glass.

4. The front cover assembly of claim 1 wherein said polyurethane is mixed with color agent.

5. The front cover assembly of claim 4 wherein said color agent is a dark red color.

6. The front cover assembly of claim 5 wherein said bezel is molded to provide a plurality of tab members.

7. The from cover assembly of claim 6 wherein said top cover contains one or more mounting materials whereby said front cover assembly is attached to said touch sensitive device.

8. The front cover assembly of claim 1 wherein said top cover and said glass are held in a fixed relationship to each other by a vacuum during injection of the polyurethane.

9. The front cover assembly of claim 1 wherein said top cover and said glass are held in a fixed relationship to each other by a mold during injection of the polyurethane.

10. The front cover assembly of claim 2 wherein said top cover is made of a polycarbonate material.

11. The from cover assembly of claim 5 wherein said top cover is made of a polycarbonate material.

12. The from cover assembly of claim 6 wherein said top cover is made of a polycarbonate material.

13. The from cover assembly of claim 6 wherein said tabs extend 0.015 of an inch above the glass.

14. A method of making a front cover assembly using an injection molding technique comprising the steps of:

inserting a piece of glass along with the top cover in a mold wherein said glass and said top cover ar held in place relative to each other by a vacuum;

injecting polyurethane into said mold between said glass and said top cover to create an integral bezel forming a mechanical lock and a liquid proof seal between said glass and said top cover;

said bezel compensating for different rates of expansion and contraction of the top cover and glass in maintaining the mechanical lock and liquid seal; and tab members formed in the bezel providing a small gap between the touch sensitive device and the glass to reduce bleeding or puddling of the touch sensitive device when a touch force is applied to the glass.

15. The method of claim 14 further comprising the step of:

mixing a coloring agent into the polyurethane before injecting the polyurethane into said mold.

16. The method of claim 15 wherein said top cover is made of a polycarbonate material, said glass is tempered glass and said color agent is a dark red color.

17. A display tablet comprising:

a front cover assembly having a top cover, a piece of tempered glass, and a bezel for securing said glass to said top cover wherein said bezel is formed by injection molding technique wherein polyurethane is injected between said tempered glass and said top cover while said tempered glass and said top cover are held in place relative to each other, wherein said bezel forms a mechanical lock between the top cover and the glass that provides a liquid tight seal;

said bezel compensating for different rates of expansion and contraction of the top cover and glass in maintaining the mechanical lock and liquid seal;

tab members formed in the bezel providing a small gap between the touch sensitive device and the glass to reduce bleeding or puddling of the touch sensitive device when a touch force is applied to the glass;

a touch ring disposed around said bezel of said front assembly, said touch ring for forming an infrared grid over said glass of said front cover assembly;

a touch controller coupled to said touch ring for controlling said touch ring and providing touch input coordinates;

a liquid crystal display disposed next to said glass of said front cover assembly;

a frame surrounding the liquid crystal display and receiving touch forces transferred thereto by the tab members; and a rear front cover assembly mated to said front cover assembly wherein said touch ring, said liquid crystal display, and said touch controller are disposed therein.

18. A computer system comprising:

a system unit;

a touch sensitive device having an infrared touch input device and a LCD;

a front cover assembly having a top cover with inner edges describing an opening in said top cover, said top cover made of a polycarbonate material; a piece of glass that fits within said opening in said top cover; and an infrared bezel for securing said glass to said top cover wherein said infrared bezel is formed by an injection molding technique wherein polyurethane is injected between said glass and said top cover while said glass and said top cover are held in place, wherein said bezel forms a mechanical lock between the top cover and the glass that provides a liquid tight seal;

said bezel compensating for different rates of expansion and contraction of the top cover and glass in maintaining the mechanical lock and liquid seal;

tab members formed in the bezel providing a small gap between the touch sensitive device and the glass to reduce bleeding or puddling of the touch sensitive device when a touch force is applied to the glass; and a frame surrounding the LCD and receiving touch forces transferred thereto by the tab members.

19. A front cover assembly for an infrared touch sensitive device comprising:

a top cover having inner edges describing an opening in said top cover, said top cover made of a polycarbonate material;

a piece of glass that fits within said opening in said top cover;

an infrared bezel for securing said glass to said top cover wherein said infrared bezel is formed by an injection molding technique wherein polyurethane is injected between said glass and said top cover while said glass end said top cover are held in place relative to each other, wherein a liquid tight seal is created between said glass, said top cover and said infrared bezel;

said bezel being a unitary member compensating for different rates of expansion and contraction of the top cover and glass in maintaining the mechanical lock and liquid seal;

tab members formed in the bezel providing a small gap between the touch sensitive device and the glass to reduce bleeding or puddling of the touch sensitive device when a touch force is applied to the glass; and a frame surrounding the touch sensitive device and receiving touch forces transferred thereto by the tab members.

20. The front cover assembly of claim 1 wherein the top cover includes an inner edge having a finger like protrusion, and wherein the bezel forms an u-shaped receptacle for receiving an edge of the piece of glass and a receptacle for receiving the edge of the top cover.

21. The display tablet of claim 17 wherein the top cover includes an inner edge having a finger like protrusion, and wherein the bezel forms an u-shaped receptacle for receiving an edge of the piece of glass and a receptacle for receiving the edge of the top cover.

22. The computer system of claim 18 wherein the top cover includes an inner edge having a finger like protrusion, and wherein the bezel forms an u-shaped receptacle for receiving an edge of the piece of glass and a receptacle for receiving the edge of the top cover.

23. The front cover assembly of claim 19 wherein the inner edges have a finger like protrusion, and wherein the bezel forms an u-shaped receptacle for receiving an edge of the piece of glass and a receptacle for receiving the edge of the top cover.

* * * * *